US011319425B2

(12) United States Patent
Mundra et al.

(10) Patent No.: US 11,319,425 B2
(45) Date of Patent: May 3, 2022

(54) COMPOSITIONS COMPRISING A TIN-BASED CATALYST AND TITANIUM DIOXIDE FOR MOISTURE CURE OF SILANE-FUNCTIONALIZED ETHYLENIC POLYMERS

(71) Applicant: Dow Global Technologies LLC, Midland, MI (US)

(72) Inventors: Manish K. Mundra, Collegeville, PA (US); Jeffrey M. Cogen, Flemington, NJ (US); Marcio Teixeira Alves, Campinas (BR); Robert E. Scheid, Jr., North Wales, PA (US); Caroline M. Grand, Phoenixville, PA (US)

(73) Assignee: Dow Global Technologies LLC, Midland, MI (US)

( * ) Notice: Subject to any disclaimer, the term of this patent is extended or adjusted under 35 U.S.C. 154(b) by 170 days.

(21) Appl. No.: 16/649,045

(22) PCT Filed: Sep. 25, 2018

(86) PCT No.: PCT/US2018/052632
§ 371 (c)(1),
(2) Date: Mar. 19, 2020

(87) PCT Pub. No.: WO2019/067440
PCT Pub. Date: Apr. 4, 2019

(65) Prior Publication Data
US 2021/0147653 A1    May 20, 2021

Related U.S. Application Data

(60) Provisional application No. 62/563,202, filed on Sep. 26, 2017.

(51) Int. Cl.
*C08K 3/22* (2006.01)
*C08F 8/00* (2006.01)
*C08K 5/57* (2006.01)

(52) U.S. Cl.
CPC ............ *C08K 3/22* (2013.01); *C08F 8/00* (2013.01); *C08K 5/57* (2013.01); *C08F 2810/20* (2013.01); *C08K 2003/2241* (2013.01)

(58) Field of Classification Search
CPC ...... C08F 30/08; C08F 2810/20; B01J 21/063; B01J 31/0212; C08K 2003/2241; C08K 2003/2231
See application file for complete search history.

(56) References Cited

U.S. PATENT DOCUMENTS

| | | |
|---|---|---|
| 3,646,155 A | 2/1972 | Scott |
| 4,144,202 A | 3/1979 | Ashcraft et al. |
| 4,446,279 A * | 5/1984 | Keogh ............... C08L 83/16 525/106 |
| 4,798,864 A * | 1/1989 | Topcik ............... C08L 23/06 525/71 |
| 5,025,071 A | 6/1991 | Bullen |
| 5,064,802 A | 11/1991 | Stevens et al. |
| 5,089,564 A | 2/1992 | Bullen |
| 5,246,783 A | 9/1993 | Spenadel et al. |
| 5,266,627 A * | 11/1993 | Meverden ........... C08K 3/04 524/527 |
| 5,272,236 A | 12/1993 | Lai et al. |
| 5,278,272 A | 1/1994 | Lai et al. |
| 5,891,979 A | 4/1999 | Dammert et al. |
| 5,986,028 A | 11/1999 | Lai et al. |
| 6,048,935 A | 4/2000 | Penfold et al. |
| 6,197,864 B1 | 3/2001 | Borke et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 8,268,924 B2 | 9/2012 | Carlsson et al. |
| 2004/0127641 A1 | 7/2004 | Fagrell et al. |
| 2008/0277137 A1 | 11/2008 | Timmers et al. |
| 2011/0111155 A1 | 5/2011 | Ek et al. |

FOREIGN PATENT DOCUMENTS

| | | |
|---|---|---|
| EP | 0256246 A2 | 2/1988 |
| EP | 0351106 B1 | 4/1995 |
| EP | 0849745 | 6/1998 |
| EP | 1433811 B1 | 2/2007 |
| WO | 9319104 | 9/1993 |
| WO | 9500526 | 1/1995 |
| WO | 9514024 | 5/1995 |
| WO | 9849212 | 11/1998 |
| WO | 2005003199 | 1/2005 |

OTHER PUBLICATIONS

Randall, "A Review of High Resolution Liquid Carbon Nuclear Magnetic Resonance Characterizations of Ethylene-Based Polymers," Rev. Macromol. Chem. Phys., 1989, p. 201-317, vol. C29, No. 2.&3.
Korenev, General and Inorganic Chemistry, 2000, p. 3, A.N. Komogorov School Moscow University Publishing.
Chemical Encyclopedia, 1995, p. 593-594, vol. 4, Scientific Publishing House, Moscow.

* cited by examiner

*Primary Examiner* — Robert C Boyle

(57) ABSTRACT

The process of curing a silane-functionalized ethylenic polymer using a tin-based catalyst, e.g., dibutyltin dilaurate, is accelerated by the addition of a titanium (IV) oxide.

9 Claims, 1 Drawing Sheet

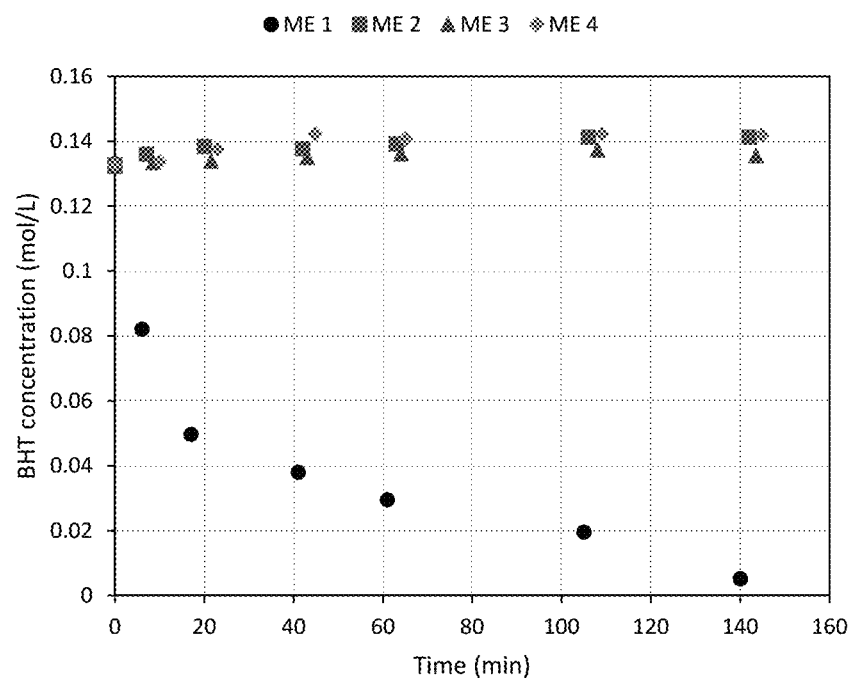

COMPOSITIONS COMPRISING A TIN-BASED CATALYST AND TITANIUM DIOXIDE FOR MOISTURE CURE OF SILANE-FUNCTIONALIZED ETHYLENIC POLYMERS

FIELD OF THE INVENTION

This invention relates to silane-functionalized ethylenic polymers. In one aspect the invention relates to the moisture cure of such polymers using a tin-based catalyst while in another aspect, the invention relates to the use of a titanium (IV) oxide to promote such a cure of the polymers.

BACKGROUND OF THE INVENTION

Silane-functionalized ethylenic polymers (in combination with appropriate catalysts) are widely employed to make the insulation/jacket layers of low voltage or medium voltage cable constructions (by extrusion processes). These polymers can be made either by copolymerization of ethylene with suitable alkoxysilanes in a reactor (to make "reactor ethylene silane copolymers", such as SI-LINK™ DFDA-5451 NT Polyethylene), or by post-reactor grafting of alkoxysilanes to ethylenic polymers. Those silane-functionalized ethylenic polymers made by the latter approach are referred to as "silane grafted ethylenic polymers" or "Si-g-ethylenic polymers", and can be classified as one of the following two types:
  SIOPLAS™ process (made in a separate step prior to use in the cable extrusion process); or
  MONOSIL™ process (made in situ during the cable manufacturing process—by one step melt blending, reaction and extrusion of ethylenic polymer compositions containing peroxide, silane and catalyst).

Silane-functionalized ethylenic polymers are moisture cured, i.e., the polymer is contacted with water under cure conditions. The cure is promoted with a catalyst, typically a tin-based catalyst. Such catalysts, e.g., dibutyltin dilaurate (DBTDL), while effective, are generally inefficient, e.g., slow, at promoting moisture-cure reactions. A tin-based catalyst cure of a cable coating comprising a silane-functionalized polyethylene typically requires cure conditions of an elevated temperature in combination with high humidity, e.g., a sauna. If cure under ambient conditions is desired, then a long period of time, e.g., a month or more, is often required. Neither cure option is particularly attractive from a commercial viewpoint.

Sulfonic acids promote cure of silane-functionalized ethylenic polymers much more rapidly than tin-based catalysts, and the cure can be commercially performed over a shorter time period, e.g., 2 weeks, at ambient conditions. The drawback of sulfonic acids and, possibly of strong Brönsted acids generally, is that they tend to degrade other additives, such as antioxidants.

BRIEF DESCRIPTION OF THE DRAWINGS

FIG. 1 is a graph showing the concentration of antioxidant (BHT) as a function of time in Model Examples in the presence of comparative catalyst systems and inventive catalyst systems. ME 1=DBSA, ME 2=DBTDL, ME 3=DBTDL/$TiO_2$, ME 4=DBTDL/tetraisopropyl titanate.

SUMMARY OF THE INVENTION

In one embodiment the invention is a catalyst composition for promoting the cure of a silane-functionalized ethylenic polymer, the catalyst composition comprising (i) a tin-based catalyst, and (ii) a titanium (IV) oxide.

In one embodiment the invention is a masterbatch comprising (A) a carrier resin, and (B) a catalyst composition comprising (i) a tin-based catalyst, and (ii) a titanium (IV) oxide.

In one embodiment the invention is a process for curing a silane-functionalized ethylenic polymer, the process comprising the steps of (1) forming a polymer composition by mixing the silane-functionalized ethylenic polymer and a catalyst composition comprising (i) a tin-based catalyst, and (ii) a titanium (IV) oxide, and (2) subjecting the polymer composition to curing conditions.

DETAILED DESCRIPTION OF THE PREFERRED EMBODIMENT

Definitions

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For a range containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Any reference to the Periodic Table of Elements is that as published by CRC Press, Inc., 1990-1991. Reference to a group of elements in this table is by the new notation for numbering groups.

Unless stated to the contrary, implicit from the context, or customary in the art, all parts and percents are based on weight and all test methods are current as of the filing date of this disclosure.

"Polymer" means a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term interpolymer, usually employed to refer to polymers prepared from at least two types of monomers. "Units derived from" and like terms refer to the mer units of the polymer, i.e., the polymerized remnant of the monomer or monomers from which the polymer is made, and not to the unpolymerized monomer itself. "Polymer" also embraces all forms of copolymer, e.g., random, block, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Ethylenic polymer", "ethylene polymer", "polyethylene" and like terms mean a polymer containing units derived from ethylene. Ethylenic polymers typically comprise at least 50 weight percent (wt %) units derived from ethylene.

"Silane-functionalized ethylenic polymer", "ethylene-vinylsilane polymer" and like terms mean an ethylenic polymer comprising silane functionality. A silane is any of various compounds of hydrogen and silicon that have the general formula $Si_nH_{2n+2}$ and are analogous to alkanes. Silane functionality means a group of atoms derived from a silane and which are part of a larger molecule. Silane functionality in or attached to a polymer can be the result of either polymerizing ethylene with a silane comonomer, e.g., a vinyl trialkoxy silane comonomer, or grafting a silane comonomer onto an ethylene polymer backbone as described, for example, in U.S. Pat. No. 3,646,155 or 6,048,935.

"Blend" and like terms mean a combination, i.e., a mixture, of two or more materials. "Polymer blend" and like terms mean a combination, i.e., mixture, of two or more polymers. Such combinations may or may not be miscible. Such combinations may or may not be phase separated. Such combinations may or may not contain one or more domain configurations, as determined from transmission electron spectroscopy, light scattering, x-ray scattering, and any other method known in the art. Polymer blends may or may not contain one or more nonpolymeric components, e.g. a mineral filler.

"Composition" and like terms mean a mixture or blend of two or more components. For example, in the context of preparing a silane-grafted ethylene polymer, a composition would include at least one ethylene polymer, at least one vinyl silane, and at least one free radical initiator. In the context of preparing a cable sheath or other article of manufacture, a composition would include an ethylene-vinylsilane copolymer, a catalyst cure system and any desired additives such as lubricant, fillers, anti-oxidants and the like.

"Catalyst composition" and like terms means a combination comprising at least one tin-based catalyst and titanium (IV) oxide, and that will promote the moisture cure of a silane functionalized ethylenic polymer at an ambient and/or elevated temperature, e.g., 90° C., in a water bath.

"Polymer composition" and like terms means a combination of (1) silane functionalized ethylenic polymer, (2) catalyst composition, and, if present, (3) any and all additives, fillers, by-products, and the like. The polymer composition can be cured or uncured.

"Catalytic amount" means an amount of tin-based catalyst necessary to promote the crosslinking of a silane functionalized ethylenic polymer at a detectable level, preferably at a commercially acceptable level.

"Crosslinked", "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

"Crosslinkable", "curable", "uncured" and like terms means that the polymer, before or after shaped into an article, is not cured or crosslinked and has not been subjected or exposed to treatment that has induced substantial crosslinking although the polymer comprises additive(s) or functionality which will cause or promote substantial crosslinking upon subjection or exposure to such treatment (e.g., exposure to water).

"Ambient conditions" and like terms mean 23° C., atmospheric pressure, and a relative humidity of 50%.

"Curing conditions" and like terms mean the temperature, pressure and humidity, necessary to crosslink a silane-functionalized ethylenic polymer. Temperature typically ranges from ambient to 100° C., atmospheric pressure, and relative humidity from ambient to 100%.

Ethylenic Polymer

The ethylenic polymers used in the practice of this invention can be branched, linear, or substantially linear, and can be made by polymerization or copolymerization in a reactor (low pressure or high pressure) or by post-reactor modification (such as reactive extrusion to make a graft copolymer). As used herein, the term "high-pressure reactor" or "high-pressure process" is any reactor or process operated at a pressure of at least 5000 pounds per square inch (psi) (34.47 megaPascal or mPa). As known to those of ordinary skill in the art, "branched" ethylenic polymers are often (but not only) prepared in a high-pressure reactor or process and tend to have highly branched polymer structures, with branches found both on the polymer backbones and on the branches themselves. In contrast, "substantially linear" denotes a polymer having a backbone that is substituted with 0.01 to 3 long-chain branches per 1,000 carbon atoms. In some embodiments, the ethylenic polymer can have a backbone that is substituted with 0.01 to 1 long-chain branches per 1,000 carbon atoms, or from 0.05 to 1 long-chain branches per 1,000 carbon atoms.

The ethylenic polymers used in the practice of this invention include both homopolymers and interpolymers, random and blocky copolymers, and functionalized (e.g., ethylene vinyl acetate, ethylene ethyl acrylate, etc.) and non-functionalized polymers. The ethylenic interpolymers include elastomers, flexomers and plastomers. The ethylene polymer comprises at least 50, preferably at least 60 and more preferably at least 80, wt % of units derived from ethylene. The other units of the ethylenic interpolymer are typically derived from one or more polymerizable monomers including (but not limited to) α-olefins and unsaturated esters.

The ethylenic polymers used in the practice of this invention, e.g., polyethylenes that contain copolymerized silane functionality are typically (though not always) made using a high pressure polymerization process, while those that are subsequently grafted with a silane, can be produced using conventional polyethylene polymerization technology, e.g., high-pressure, Ziegler-Natta, metallocene or constrained geometry catalysis. In one embodiment, the polyethylene is made using a high pressure process. In another embodiment, the polyethylene is made using a mono- or bis-cyclopentadienyl, indenyl, or fluorenyl transition metal (preferably Group 4) catalysts or constrained geometry catalysts (CGC) in combination with an activator, in a solution, slurry, or gas phase polymerization process. U.S. Pat. No. 5,064,802, WO93/19104 and WO95/00526 disclose constrained geometry metal complexes and methods for their preparation. Variously substituted indenyl containing metal complexes are taught in WO95/14024 and WO98/49212.

In general, polymerization can be accomplished at conditions well-known in the art for Ziegler-Natta or Kaminsky-Sinn type polymerization reactions, that is, at temperatures from 0-250° C., preferably 30-200° C., and pressures from atmospheric to 10,000 atmospheres (1013 megaPascal (MPa)). Suspension, solution, slurry, gas phase, solid state powder polymerization or other process conditions may be employed if desired. The catalyst can be supported or unsupported, and the composition of the support can vary widely. Silica, alumina or a polymer (especially poly(tetrafluoroethylene) or a polyolefin) are representative supports, and desirably a support is employed when the catalyst is used in a gas phase polymerization process. The support is preferably employed in an amount sufficient to provide a weight ratio of catalyst (based on metal) to support within a range of from 1:100,000 to 1:10, more preferably from 1:50,000 to 1:20, and most preferably from 1:10,000 to 1:30. In most polymerization reactions, the molar ratio of catalyst to polymerizable compounds employed is from 10-12:1 to 10-1:1, more preferably from $10^{-9}$:1 to $10^{-5}$:1.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene.

The ethylene polymers useful in the practice of this invention include ethylene/α-olefin interpolymers having a α-olefin content of between about 15, preferably at least about 20 and even more preferably at least about 25, wt % based on the weight of the interpolymer. These interpolymers typically have an α-olefin content of less than about 50, preferably less than about 45, more preferably less than about 40 and even more preferably less than about 35, wt % based on the weight of the interpolymer. The α-olefin content is measured by $^{13}C$ nuclear magnetic resonance (NMR) spectroscopy using the procedure described in Randall (*Rev. Macromol. Chem. Phys.*, C29 (2&3)). Generally, the greater the α-olefin content of the interpolymer, the lower the density and the more amorphous the interpolymer, and this translates into desirable physical and chemical properties for the protective insulation layer.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative ethylene polymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

The ethylene polymers used in the practice of this invention can be used alone or in combination with one or more other ethylene polymers, e.g., a blend of two or more ethylene polymers that differ from one another by monomer composition and content, catalytic method of preparation, etc. If the ethylene polymer is a blend of two or more ethylene polymers, then the ethylene polymer can be blended by any in-reactor or post-reactor process. The in-reactor blending processes are preferred to the post-reactor blending processes, and the processes using multiple reactors connected in series are the preferred in-reactor blending processes. These reactors can be charged with the same catalyst but operated at different conditions, e.g., different reactant concentrations, temperatures, pressures, etc, or operated at the same conditions but charged with different catalysts.

Examples of ethylene polymers made with high pressure processes include (but are not limited to) low density polyethylene (LDPE), ethylene silane reactor copolymer (such as SiLINK™ made by The Dow Chemical Company), ethylene vinyl acetate copolymer (EVA), ethylene ethyl acrylate copolymer (EEA), and ethylene silane acrylate terpolymers. For use in the present invention, all of the polymers mentioned in this paragraph would require silane grafting to be used in this invention, with the exception of the ethylene silane reactor copolymer, which is ready to use in the present invention.

Examples of ethylenic polymers useful in the practice of this invention include high density polyethylene (HDPE); medium density polyethylene (MDPE); linear low density polyethylene (LLDPE); low density polyethylene (LDPE); very low density polyethylene (VLDPE); homogeneously branched, linear ethylene/α-olefin copolymers (e.g. TAFMER™ by Mitsui Petrochemicals Company Limited and EXACT™ by DEX-Plastomers); homogeneously branched, substantially linear ethylene/α-olefin polymers (e.g., AFFINITY™ polyolefin plastomers and ENGAGE™ polyolefin elastomers available from The Dow Chemical Company); and ethylene block copolymers (INFUSE™ also available from The Dow Chemical Company). The substantially linear ethylene copolymers are more fully described in U.S. Pat. Nos. 5,272,236, 5,278,272 and 5,986,028, and the ethylene block copolymers are more fully described in U.S. Pat. Nos. 7,579,408, 7,355,089 7,524,911, 7,514,517, 7,582, 716 and 7,504,347.

Ethylenic interpolymers of particular interest for use in the practice of this invention are LDPE, linear low density polyethylene (LLDPE) and HDPE. These ethylenic copolymers are commercially available from a number of different sources including The Dow Chemical Company under such trademarks as DOWLEX™, ATTANE™ and FLEXOMER™. One preferred polymer is linear low density polyethylene (LLDPE).

They ethylenic polymers have a melt index ($I_2$) in the range of 0.1 to 50 decigrams per minute (dg/min), or 0.3 to 30 dg/min, or 0.5 to 20 dg/min. $I_2$ is determined under ASTM D-1238, Condition E and measured at 190° C. and 2.16 kg.

Silane Functionality

Any silane that will effectively copolymerize with ethylene, or graft to and crosslink an ethylene polymer, can be used in the practice of this invention, and those described by the following formula as a particular example but not restricted to only this formula:

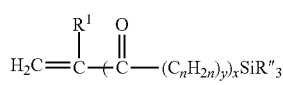

in which $R^1$ is a hydrogen atom or methyl group; x and y are 0 or 1 with the proviso that when x is 1, y is 1; n is an integer from 1 to 12 inclusive, preferably 1 to 4, and each R″ independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl. Such silanes may be copolymerized with ethylene in a reactor, such as a high pressure process. Such silanes may also be grafted to a suitable ethylene polymer by the use of a suitable quantity of organic peroxide, either before or during a shaping or molding operation. Additional ingredients such as heat and light stabilizers, pigments, etc., also may be included in the formulation. In any case, the crosslinking reaction typically takes place following the shaping or molding step by moisture-induced reaction between the grafted or copolymerized silane groups, the water permeating into the bulk polymer from the atmosphere or from a water bath or "sauna". The phase of the process during which the crosslinks are created is commonly referred to as the "cure phase" and the process itself is commonly referred to as "curing".

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Vinyl trimethoxy silane (VTMS), vinyl triethoxy silane, vinyl triacetoxy silane, gamma-(meth)acryloxy propyl trimethoxy silane and mixtures of these silanes are the preferred silane crosslinkers for use in this invention. If filler is present, then preferably the crosslinker includes vinyl trialkoxy silane.

The amount of silane crosslinker used in the practice of this invention can vary widely depending upon the nature of the polymer, the silane, the processing or reactor conditions, the grafting or copolymerization efficiency, the ultimate application, and similar factors, but typically at least 0.5, preferably at least 0.7, weight percent is used. Considerations of convenience and economy are two of the principal limitations on the maximum amount of silane crosslinker used in the practice of this invention, and typically the maximum amount of silane crosslinker does not exceed 5, preferably it does not exceed 3, weight percent.

The silane crosslinker is grafted to the polymer by any conventional method, typically in the presence of a free radical initiator, e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is 2,2-azobisisobutyronitrile, though these are typically less effective than peroxides. The amount of initiator can vary, but it is typically present in an amount of at least 0.04, preferably at least 0.06, parts per hundred resin (phr). Typically, the initiator does not exceed 0.15, preferably it does not exceed about 0.10, phr. The weight ratio of silane crosslinker to initiator also can vary widely, but the typical crosslinker:initiator weight ratio is between 10:1 to 500:1, preferably between 18:1 and 250:1. As used in parts per hundred resin or phr, "resin" means the olefinic polymer.

While any conventional method can be used to graft the silane crosslinker to the polyolefin polymer, one preferred method is blending the two with the initiator in the first stage of a reactor extruder, such as a Buss kneader. The grafting conditions can vary, but the melt temperatures are typically between 160 and 260° C., preferably between 190 and 230° C., depending upon the residence time and the half-life of the initiator.

Copolymerization of vinyl trialkoxysilane crosslinkers with ethylene and other monomers may be done in a high-pressure reactor that is used in the manufacture of ethylene homopolymers and copolymers of ethylene with vinyl acetate and acrylates.

Catalyst Composition

The catalyst compositions used in the practice of this invention comprise a tin-based catalyst and a titanium (IV) oxide. The tin-based catalysts are Lewis acids and include, but are not limited to, the various organic derivatives of tin(I), tin(II), tin (III) and tin (IV). Exemplary of these compounds, also known as organotin compounds or stannanes, are the organotin halides, hydrides, oxides and hydroxides; the hyper-coordinated stannanes; and the triorganotin cations. Specific catalysts include, but are not limited to, dibutyl tin dilaurate (DBTDL), dimethyl hydroxy tin oleate, dioctyl tin maleate, di-n-butyl tin maleate, dibutyl tin diacetate, dibutyl tin dioctoate, stannous acetate and stannous octoate, and distannoxanes such as those disclosed in US 2008/0277137. Many are commercially available, and DBTDL is a preferred tin-based catalyst.

The titanium (IV) oxide is a composition having from two to four titanium oxygen bonds (Ti—O). The titanium (IV) oxide includes titanium oxygen bonds that are (i) a single bond (Ti—OR, where R is a $C_1$-$C_3$ hydrocarbonyl group), (ii) a double bond (Ti=O), and (iii) a combination of (i) and (ii).

In an embodiment, the titanium (IV) oxide is titanium dioxide, or $TiO_2$. Titanium dioxide is a white, unreactive solid that occurs naturally as the mineral rutile and is used extensively as a white pigment. The physical properties of the titanium dioxide can vary widely, but typically and preferably it is a fine, white powder with a median particle size of 0.10 to 0.50 microns. The commercially available $TiO_2$ that can be used in the practice of this invention, e.g., Ti-Pure™ titanium dioxide, typically comprises 90 weight percent (wt %) more $TiO_2$ with the remainder comprising an assortment of other materials, e.g., alumina, silica, carbon, etc.

In an embodiment, the titanium (IV) oxide is tetratisopropyl titanate. Tetraisopropyl titanate is titanium (IV) isopropoxide and has four Ti—OR bonds wherein R is a $C_3$ hydrocarbonyl group. Titanium (IV) isopropoxide has the Structure (1) below:

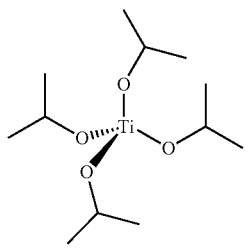

Structure (1)

In an embodiment, the catalyst composition includes the tin-based catalyst and tetraisopropyl titanate at a weight percent ratio from 0.5:1.0, or 1:1 to 1.0:0.5, based on total weight catalyst composition. In a further embodiment the tin-based catalyst and tetraisopropyl titanate are present in the catalyst composition at a 1:1 weight percent ratio, based on total weight catalyst composition.

In an embodiment, the tetraisopropyl titanate is titanium (IV) isopropoxide, CAS number 546-68-9, and 97% purity available from Sigma-Aldrich, Inc.

In an embodiment, the catalyst composition used in the practice of this invention comprises a tin-based catalyst paired with $TiO_2$. For 100 grams (g) of the composition, the molar ratio of tin-based catalyst to $TiO_2$ is typically from 0.00004:0.003 to 0.0012:1.00, more typically from 0.0002:0.03 to 0.0008:0.500, and more typically from 0.0004:0.06 to 0.0006:0.025 (the molecular weight of the tin catalyst used=631.56 g/mol, and the molecular weight of $TiO_2$ used=79.866 g/mol).

The minimum amount of catalyst composition used in the practice of this invention is a catalytic amount. Typically this amount is at least 0.02, preferably at least 0.13 and more preferably at least 0.26, weight percent (wt %) based on the weight of the polymer composition. The only limit on the maximum amount of catalyst composition in the polymer composition is that imposed by economics and practicality (e.g., diminishing returns), but typically a general maximum comprises less than 30, preferably less than 15 and more preferably less than 1, wt % based on the weight of the polymer composition. Sufficient catalyst composition is used in the practice of this invention such that the total amount of $TiO_2$ in the polymer composition is at least 0.25-2.5 or 2.5, or 3.0, or 3.5, or 4.0, or 4.5, or 5.0, or 5.0-10.0 or 10.0–20.0, or 20-40 wt % based on the weight of the cured polymer.

The catalyst composition is typically prepared in the form of a masterbatch. One or the other of the tin-based catalyst and titanium (IV) oxide is first added to and mixed with a carrier resin and once well mixed, the other is added to the mix. Alternatively, the tin-based catalyst and titanium (IV) oxide can be added simultaneously to the carrier resin, or each of the tin-based catalyst and titanium (IV) oxide can be added to and mixed with separate portions of the carrier resin, and then the two mixes can be blended together. The masterbatch may or may not contain additives, fillers, and the like. In one embodiment the masterbatch comprises from 0.002 to 0.05, or from 0.05 to 0.1, or from 0.1 to 0.3, or from 0.3 to 1.0 or from 1 to 5.0 or from 5.0–10.0 or from 10.0 to 20.0 or from 20.0 to 30.0 or from 30.0 to 50.0 or from 50.0 to 80 wt % catalyst composition based on the weight of the masterbatch. Masterbatches are conveniently formed by melt compounding methods.

Additives

Both the catalytic and polymer compositions of this invention can contain additives, fillers, and the like, and these include, but are not limited to, antioxidants (e.g., IRGANOX™ 1010 (a hindered phenol) and IRGAFOS™ 168 (a phosphite), both available from Ciba Specialty Chemicals); UV stabilizers; cling additives; light stabilizers (e.g., hindered amines); plasticizers (such as dioctylphthalate or epoxidized soy bean oil); thermal stabilizers; mold release agents; tackifiers (e.g., hydrocarbon tackifiers); waxes (e.g., polyethylene waxes); processing aids (e.g., oils, organic acids such as stearic acid, metal salts of organic acids); colorants and pigments; and filler (e.g., carbon black, talc, etc.). These additives, etc. are used in known amounts and in known ways to the extent that they do not interfere with the desired physical or mechanical properties of the catalytic or polymer compositions either during processing or as a final product.

Compounding/Fabrication

Compounding of the silane-functionalized ethylene polymer, catalyst composition and additives, etc., if any, can be performed by standard means known to those skilled in the art. Examples of compounding equipment are internal batch mixers, such as a BANBURY™ or BOLLING™ internal mixer. Alternatively, continuous single or twin screw mixers can be used, such as a FARREL™ continuous mixer, a WERNER AND PFLEIDERER™ twin screw mixer, or a BUSS™ kneading continuous extruder. The type of mixer utilized, and the operating conditions of the mixer, will affect properties of the polymer composition such as viscosity, volume resistivity, and extruded surface smoothness.

The silane functionalized ethylenic polymer, catalyst composition, and additives, if any, are typically mixed at a temperature and for a length of time sufficient to fully homogenize the mixture but insufficient to create any significant amounts of gel. The catalyst composition is typically added to silane functionalized ethylenic polymer but it can be added before, with or after the additives, etc., if any. Typically, all of the polymer composition components are mixed together in a melt-mixing device. The mixture is then shaped into the final article. The temperature of compounding and article fabrication is typically above the melting point of the ethylenic polymer but below 250° C. In some embodiments it may desirable to soak one or more of the additives, including catalyst (e.g. tin compound), into solid polymer at a temperature below the polymer melting point.

Articles of Manufacture

In one embodiment, the polymer composition of this invention can be applied to a cable as a sheath or insulation layer in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the polymer composition are formulated, the polymer composition is extruded over the cable as the cable is drawn through the die. Cure may begin in the reactor-extruder.

The formed article is then typically subjected to a cure period, which takes place at temperatures from ambient up to but below the melting point of the polymer until the article has reached the desired degree of crosslinking. In one preferred embodiment, the cure is augmented by externally supplied water permeating into the bulk polymer from the atmosphere or from a water bath or "sauna". Generally, such a cure may take place at ambient or elevated temperature but the temperature of the cure should be above 0° C.

Other articles of manufacture that can be prepared from the polymer compositions of this invention, particularly under high pressure and/or elevated moisture conditions, include fibers, ribbons, sheets, tapes, tubes, pipes, weather-stripping, seals, gaskets, foams, footwear and bellows. These articles can be manufactured using known equipment and techniques.

The combination of titanium (IV) oxide with a tin-based moisture-cure catalyst (e.g., DBTDL) increases the cure rate of a silane functionalized ethylenic polymer sufficiently to allow the polymer to cure at ambient conditions with similar results to that of using a sulfonic-acid catalyst. For samples of 120 mil thick and cured for 30 days at ambient conditions (23° C. and 50% RH), hot creep was less than 175% when measured at 200° C. and 20 N. For 30 mil thick sample cured for at least 1 day at ambient conditions (23° C. and 50% RH), hot creep was less than 175% measured at 200° C. and 20 N.

Interestingly, the addition of titanium (IV) oxide to a masterbatch containing a sulfonic acid catalyst does not have a similar impact of improving cure performance of the silane functionalized ethylenic polymer as does addition to a masterbatch containing a tin-based catalyst; in fact, $TiO_2$ may inhibit to a degree the performance of the sulfonic acid catalyst. For example, a comparison of CE1 and CE2 with CE 3 and CE4 (all reported below) shows that when $TiO_2$ is present with a sulfonic acid catalyst, the cure is slower than with the sulfonic acid catalyst alone. The results suggest a synergistic effect between titanium (IV) oxide and the tin-based catalyst.

Sulfonic acids promote cure of silane-functionalized ethylenic polymers more rapidly than tin-based catalysts, and the cure can be commercially performed over a shorter time period, e.g., 2 weeks, at ambient conditions. The drawback of sulfonic acids is that they degrade other additives, such as antioxidants—and antioxidants with t-butyl linkages in particular. Applicant discovered curing the silane-functionalized ethylenic polymer with the catalyst composition composed of (1) tin-based catalyst and (2) titanium (IV) oxide advantageously cures at a rate the same as, or less than, the cure rate for sulfonic acids and does not degrade antioxidants and/or does not degrade antioxidants with t-butyl linkages.

The invention is described more fully through the following examples. Unless otherwise noted, all parts and percentages are by weight.

EXAMPLES

Test Methods
Hot Creep
Hot creep elongation is done according to UL 2556 Section 7.9. Three samples are prepared from the pressed plaque sample by cutting a dog bone with a die press. The total weight is determined by using the following equation:

$$Wt = CA \times 29.0 \text{ lb}_f/\text{in}^2$$

where CA=the cross sectional area of the specimen.

Two marks, 25±2.5 millimeters (mm) apart are placed on a specimen not under tension. The marks are at right angles to the direction of pull during testing. One end of the specimen is attached to the upper grip of the test assembly while the calculated weight is attached to the other end and the distance between the marks is recorded. The entire assembly is placed in a circulating-air oven preheated to 200° C.±2° C. for 15 minutes (min). After 15 min, and with the weight still attached, the distance between the marks is measured with a scale to the nearest 1 mm. The hot creep elongation is calculated using the following equation:

$$C = \frac{100 \times (D_e - G)}{G}$$

where
C=hot creep elongation, %
$D_e$=distance between the benchmarks obtained, and
G=original distance between the benchmarks.

Tensile Strength
Tensile strength and elongation at break are done according to UL 2556 Section 3.5 using a device that indicates the actual maximum load at which the specimen breaks. The device operates a power-actuated jaw at speeds of 12 to 305 mm/min and a precision of 20% of the set speed. Three samples are prepared from the finished plaque by cutting a dog bone using a die press. The straight specimen is gauge marked at two points 250±2 mm (10±0.08 in) apart. The specimen is gripped in the jaws of the machine with the gauge marks between the jaws, and the jaws are caused to separate at the rate of 10 in/min. Valid breaks take place between the gauge marks and are no closer than 25 mm (1 in) to either gauge mark. The maximum load before break is recorded. The distance between the gauge marks at the time of break is recorded to the nearest 2 mm (0.08 in).

Materials
CHEMOURS™ R105 titanium dioxide ($TiO_2$) is a fine, dry powder comprising at least 92 wt % $TiO_2$, no more than 3.2 wt % alumina, no more than 3.5 wt % silica, and 0.2 wt % carbon.

Tetraisopropyl Titanate is Titaniun (IV) isoproxide, 97% purity, from Sigma-Aldrich, Inc.

IRGANOX™ 1010 antioxidant is pentaerythritol tetrakis (3,5-di-tert-butyl-4-hydroxyhydrocinnamate).

Carbon C is Carbon Black, CSX-362.

Silink Copolymer A—DOW SI-LINK™ DFDA-5451 NT Polyethylene—reactor ethylene silane copolymer, melt index, $I_2$ (dg/min)=1.5, density (g/cm³)=0.922, VTMS content (wt %)=1.5, PDI (Mw/Mn)=5.5.

DOW DNDA-8320 NT 7 Linear Low Density Polyethylene Resin with density, ASTM D4703, A1 Proc C, Test within 1 h, g/cm³=0.9220-0.926 and Melt Index, @190° C./2.16 kg, dg/min=16-24.

DFH-2065-melt index, $I_2$ (dg/min)=0.7 (ASTM D792), density (g/cm³)=0.921 (ASTM D1238), VTMS content (wt %)=0.0, PDI (Mw/Mn)=12.7.

DXM-316 or Dow AMPLIFY™ EA 100 Functional Polymer (Ethylene-Ethyl Acrylate Copolymer)—melt index, $I_2$ (dg/min)=1.3, density (g/cm3)=0.930, VTMS content (wt %)=0.0, PDI (Mw/Mn)=4.7.

DFH-2076 LLDPE—melt index, 12 (dg/min)=0.7 (ASTM D792), density (g/cm³)=0.921 (ASTM D1238), VTMS content (wt %)=0.0, PDI (Mw/Mn)=12.7.

DXM 446 low density polyethylene—density, ASTM D4703, A1 Proc C, Test within 1 h, g/cm³=0.9175-0.9230 (ASTM D792), melt index, @190° C./2.16 kg, dg/min=2.35.

1,2-Bis(3,5-di-tert-butyl-4-hydroxyhydrocinnamoyl)hydrazine, Technical Grade-SONGNOX™ 1024 FG Tetrakis(methylene(3,5-di-tert-butyl-4-hydroxyhydrocinnamate))methane-IRGANOX™1010

Dibutyltin Dilaurate—BNT Cat 425.

2,2'-(2-Methylpropylidene)bis(4,6-dimethylphenol), 99%—LOWINOX™221B46

Hydrophobic Sulfonic Acid Catalyst, 100%—NACURE™ B201

Ethanedioic Acid, Bis(phenylmethylene) Hydrazide, 100%—OABH

Bis-(2,2-diphenylpropyl)amine—NAUGARD™ 445

Stannous Sulfate, 95+%—TIN(II) SULFATE, 95+%

4,4-Thiobis(6-tert-butyl-m-cresol)—LOWINOX™ TBM-6 NDB

Octyltriethoxysilane—PROSIL™ 9202

Dodecane, 99% purity from Acros Organics

BHT—Butylated Hydroxytoluene, 99% purity from TCI

DBSA—4-Dodecylbenzenesulfonic Acid, 95% purity from Sigma-Aldrich, Inc.

Sample Preparation

The compositions reported in Tables 1 and 2 are prepared using a 420 milliliter (mL) BRABENDER™ mixing bowl with cam rotors. The batch mass is calculated to provide 70% fill of the mixing bowl with each of the formulations described in this invention. The mixing bowl is pre-heated to a set temperature of 150° C. and the rotor speed set to 25 revolutions per minute (rpm). Half of the polymer is added to the bowl and fluxed until a polymer melt is formed. Next, all the fillers which includes titanium (IV) oxide and carbon black are added slowly and incorporated into the polymer melt. The remaining amounts of polymers and antioxidants are then added and the rotor speed is increased to 40 rpm. The batch is allowed to flux for an additional 5 minutes. Upon removal from the mixing bowl the formulation is placed in a cold press for 5 minutes. The resulting plaque is cut into smaller pieces. The chips are then fed to a BRABENDER™ model Prep Mixer/Measuring Head laboratory electric batch mixer equipped with 24:1 extruder. A 24:1 Maddox mixing head screw is employed to convey and melt the polymer through a stranded die (at 40 rpm screw speed, using a 20/40/60/20 mesh screen pack and a flat set temperature profile of 150° C. across zone 1, zone 2, zone 3 and die). The stranded extrudate is again Wiley milled to produce pellets.

These are then placed in a 8 inch×8 inch mold of various thickness and compression molded at the following conditions: 150° C. for 5 min at 500 pounds per square inch (psi), followed by 2500 psi for 5 min at 180° C., and subsequently slow cooling at this pressure until the mold temperature reaches 40° C. The compression molded plaque is then used for measuring hot creep or tensile and elongation performance.

TABLE 1

Ethylene Silane Copolymers in Crosslinked Cable Constructions Made from Comparative Examples 1 to 5 and Inventive Examples 1 to 3

| Sample # | CE 1 | CE 2 | CE 3 | CE 4 | CE 5 | IE 1 | IE 2 | IE 3 |
|---|---|---|---|---|---|---|---|---|
| Silink Copolymer A | 94.53 | 89.55 | 89.55 | 84.58 | 89.55 | 89.55 | 87.06 | 84.58 |
| DOW DNDA-8320 NT 7 Linear Low Density Polyethylene Resin | | | 2.33 | 2.33 | | 2.33 | 2.33 | 2.33 |
| DFH -2076 LLDPE | | | | | 8.57 | 4.29 | 6.43 | 8.57 |
| DFH -2065 | 2.29 | 4.58 | 2.29 | 4.58 | | | | |
| DXM - 316 | 2.29 | 4.58 | 2.29 | 4.58 | | | | |
| DXM-446 | | | | | 0.67 | 0.33 | 0.50 | 0.67 |
| Chemours R105 -TiO2 | | | 2.50 | 2.50 | 2.50 | 2.50 | 2.50 | 2.50 |
| Carbon C | | | 0.07 | 0.07 | 0.07 | 0.07 | 0.07 | 0.07 |
| 4,4-Thiobis(6-tert-butyl-m-cresol) | | | 0.0003 | 0.0003 | | 0.0003 | 0.0003 | 0.0003 |
| 2,2'-(2-Methylpropylidene)bis (4,6-dimethylphenol), 99% | 0.22 | 0.44 | 0.22 | 0.44 | | | | |
| Ethanedioic Acid, Bis(phenylmethylene) Hydrazide, 100% | 0.04 | 0.08 | 0.04 | 0.08 | | | | |
| Bis-(2,2-diphenylpropyl)amine | 0.03 | 0.05 | 0.03 | 0.05 | | | | |
| 1,2-Bis(3,5-di-tert-butyl-4-hydroxyhydrocinnamoyl)hydrazine, Technical Grade | | | | | 0.17 | 0.08 | 0.13 | 0.17 |
| Tetrakis(methylene(3,5-di-tert-butyl-4-hydroxyhydrocinnamate))methane | | | 0.10 | 0.10 | 0.33 | 0.27 | 0.35 | 0.43 |
| Dibutyltin Dilaurate | | | | | 0.26 | 0.13 | 0.20 | 0.26 |
| Hydrophobic Sulfonic Acid Catalyst, 100% | 0.14 | 0.28 | 0.14 | 0.28 | | | | |
| Stannous Sulfate, 95+% | 0.0000015 | 0.000003 | 0.0000015 | 0.000003 | | | | |
| Octyltriethoxysilane | 0.48 | 0.45 | 0.45 | 0.43 | 0.45 | 0.45 | 0.44 | 0.43 |
| | 100.00 | 100.00 | 100.00 | 100.00 | 100.00 | 100.00 | 100.00 | 100.00 |

TABLE 2

Hot Creep Performance of Ethylene Silane Copolymers in Crosslinked Constructions Made from Comparative Examples 1 to 5 and Inventive Examples 1 to 3

| 120 Mil Plaque, AC (23 C./50% RH) | CE 1 | CE2 | CE3 | CE4 | CE5 | IE 1 | IE 2 | IE 3 |
|---|---|---|---|---|---|---|---|---|
| 7 | failed | failed | failed | failed | Failed | failed | failed | Failed |
| 14 | failed | 84 | failed | failed | Failed | failed | 167 | 106 |
| 21 | 85 | 55 | failed | failed | Failed | failed | 41 | 51 |
| 30 | 52 | 43 | failed | failed | 78 | 66 | 47 | 49 |

TABLE 2-continued

Hot Creep Performance of Ethylene Silane Copolymers in Crosslinked Constructions Made from Comparative Examples 1 to 5 and Inventive Examples 1 to 3

| Hydrophobic Sulfonic Acid Catalyst, 100% | 0.140 | 0.280 | 0.140 | 0.280 | | | | |
|---|---|---|---|---|---|---|---|---|
| Dibutyltin Dilaurate | | | | | 0.260 | 0.130 | 0.195 | 0.260 |
| TiO2 loading | | | 2.5 | 2.5 | | 2.5 | 2.5 | 2.5 |

| 160 Mil Plaque, AC (23 C./50% RH) | CE 5 | IE 2 |
|---|---|---|
| 7 | failed | Failed |
| 14 | failed | Failed |
| 21 | failed | Failed |
| 30 | failed | 102 |
| Hydrophobic Acid Catalyst, 100% | | |
| Dibutyltin Dilaurate | 0.260 | 0.195 |
| TiO2 loading | | 2.5 |

TABLE 3

Ethylene Silane Copolymers in Crosslinked Constructions Made from Comparative Example 6 and Inventive Examples 4 to 7

| Sample # | CE 6 | IE 4 | IE 5 | IE 6 | IE 7 |
|---|---|---|---|---|---|
| Silink Copolymer A | 80.60 | 83.58 | 82.59 | 81.59 | 80.60 |
| DOW DNDA-8320 NT 7 Linear Low Density Polyethylene Resin | 4.66 | 4.66 | 4.66 | 4.66 | 4.66 |
| DFH -2065 | 4.12 | | | | |
| DXM - 316 | 4.12 | | | | |
| DFH -2076 LLDPE | | 5.14 | 6.00 | 6.86 | 7.72 |
| DXM-446 | | 0.40 | 0.47 | 0.53 | 0.60 |
| CHEMOURS ™ R105-TiO2 | 5.00 | 5.00 | 5.00 | 5.00 | 5.00 |
| Carbon C | 0.14 | 0.14 | 0.14 | 0.14 | 0.14 |
| 4,4-Thiobis(6-tert-butyl-m-cresol) | 0.001 | 0.001 | 0.001 | 0.001 | 0.001 |
| 2,2'-(2-Methylpropylidene)bis (4,6-dimethylphenoi), 99% | 0.40 | | | | |
| Bis-(2,2-diphenylpropyl)amine | 0.05 | | | | |
| 1,2-Bis(3,5-di-tert-butyl-4-hydroxyhydrocinnamoyl)hydrazine, Technical Grade | | 0.10 | 0.12 | 0.13 | 0.15 |
| Tetrakis(methylene(3,5-di-tert-butyl-4-hydroxyhydrocinnamate))methane | 0.20 | 0.40 | 0.43 | 0.47 | 0.50 |
| Dibutyltin Dilaurate | | 0.16 | 0.18 | 0.21 | 0.23 |
| Hydrophobic Sulfonic Acid Catalyst, 100% | 0.25 | | | | |
| Ethanedioic Acid, Bis(phenylmethylene) Hydrazide, 100% | 0.07 | | | | |
| Stannous Sulfate, 95+% | 2.70E−06 | | | | |
| Octyltriethoxysilane | 0.41 | 0.42 | 0.42 | 0.41 | 0.41 |
| | 100.00 | 100.00 | 100.00 | 100.00 | 100.00 |

TABLE 4

Hot Creep Performance of Ethylene Silane Copolymers in Crosslinked Constructions Made from Comparative Example 6 and Inventive Examples 4 to 7

| Description | Cat type | Cat loading, wt % | Time, days | Hot Creep, % | Cure type (AC cure = 23 C. at 50% relative humidity | Thickness, mils |
|---|---|---|---|---|---|---|
| CE 6 | A-5488 | 0.252 | 10 | Failed | AC Cure | 60 |
| CE 6 | A-5488 | 0.252 | 18 | failed | AC Cure | 60 |
| CE 6 | A-5488 | 0.252 | 25 | failed | AC Cure | 60 |
| IE 4 | A-5481 | 0.156 | 10 | 70.43 | AC Cure | 60 |
| IE 4 | A-5481 | 0.156 | 18 | 52.47 | AC Cure | 60 |
| IE 4 | A-5481 | 0.156 | 25 | 48.92 | AC Cure | 60 |
| IE 5 | A-5481 | 0.182 | 10 | 59.84 | AC Cure | 60 |
| IE 5 | A-5481 | 0.182 | 18 | 49.55 | AC Cure | 60 |
| IE 5 | A-5481 | 0.182 | 25 | 43.62 | AC Cure | 60 |
| IE 6 | A-5481 | 0.208 | 10 | 51.93 | AC Cure | 60 |
| IE 6 | A-5481 | 0.208 | 18 | 44.79 | AC Cure | 60 |
| IE 6 | A-5481 | 0.208 | 25 | 40.66 | AC Cure | 60 |
| IE 7 | A-5481 | 0.234 | 7 | 50.43 | AC Cure | 60 |

TABLE 4-continued

Hot Creep Performance of Ethylene Silane Copolymers in Crosslinked Constructions Made from Comparative Example 6 and Inventive Examples 4 to 7

| | | | | | | |
|---|---|---|---|---|---|---|
| IE 7 | A-5481 | 0.234 | 11 | 43.74 | AC Cure | 60 |
| IE 7 | A-5481 | 0.234 | 19 | 37.83 | AC Cure | 60 |

| Description | Cat type | Cat loading, wt % | Cure time, hours | Hot Creep, % | Cure type | Thickness, mils |
|---|---|---|---|---|---|---|
| IE 7 | Tin Catalyst | 0.234 | 16 | 16.85 | 90 C. water bath | 60 |
| CE 6 | Acid catalyst | 0.252 | 24 | 160 | 90 C. water bath | 60 |

The data shows that when $TiO_2$ is present with a tin catalyst, the cure rates are significantly faster even in comparison to a sulfonic acid based catalyst with $TiO_2$. This shows that lower hot creep values are obtained at shorter cure times with $TiO_2$ and tin system as compared to higher hot creep values at longer cure times obtained with a sulfonic acid and $TiO_2$ system.

TABLE 5

Hot Creep Performance of Ethylene Silane Copolymers in Crosslinked Constructions Made from Comparative Examples 7-11 and Inventive Examples 8-9

| Sample # | CE 7 | CE 8 | CE 9 | CE 10 | CE 11 | IE 8 | IE 9 |
|---|---|---|---|---|---|---|---|
| Silink Copolymer A | 94.53 | 89.55 | 94.53 | 94.53 | 89.55 | 89.55 | 79.60 |
| DOW DNDA-8320 NT 7 Linear Low Density Polyethylene Resin | | | | 2.33 | 4.66 | 2.33 | 4.66 |
| DFH -2076 LLDPE | 4.29 | 8.57 | | | | 4.29 | 8.57 |
| DXM-446 | 0.33 | 0.67 | | | | 0.33 | 0.67 |
| DFH -2065 | | | 2.29 | | | | |
| DXM-316 | | | 2.29 | | | | |
| Chemours R105 - TiO2 | | | | 2.50 | 5.00 | 2.50 | 5.00 |
| Carbon C | | | | 0.07 | 0.14 | 0.07 | 0.14 |
| 4,4-Thiobis(6-tert-butyl-m-cresol) | | | | 0.0003 | 0.0006 | 0.0003 | 0.0006 |
| 1,2-Bis(3,5-di-tert-butyl-4-hydroxyhydrocinnamoyl)hydrazine, Technical Grade | 0.08 | 0.17 | | | | 0.08 | 0.17 |
| 2,2'-(2-Methylpropylidene)bis (4,6-dimethylphenol), 99% | | | 0.22 | | | | |
| Ethanedioic Acid, Bis(phenylmethylene) Hydrazide, 100% | | | 0.04 | | | | |
| Bis-(2,2-diphenylpropyl)amine | | | 0.03 | | | | |
| Tetrakis(methylene(3,5-di-tert-butyl-4-hydroxyhydrocinnamate))methane | 0.17 | 0.33 | | 0.10 | 0.20 | 0.27 | 0.53 |
| Dibutyltin Dilaurate | 0.13 | 0.26 | | | | 0.13 | 0.26 |
| Hydrophobic Sulfonic Acid Catalyst, 100% | | | 0.14 | | | | |
| Stannous Sulfate, 95+% | | | | 0.0000015 | | | |
| Octyltriethoxysilane | 0.48 | 0.45 | 0.48 | 0.48 | 0.45 | 0.45 | 0.40 |
| Total | 100.00 | 100.00 | 100.00 | 100.00 | 100.00 | 100.00 | 100.00 |
| TiO2 | 0.00 | 0.00 | 0.00 | 2.50 | 5.00 | 2.50 | 5.00 |
| Dibutyltin Dilaurate | 0.13 | 0.26 | 0.00 | 0.00 | 0.00 | 0.13 | 0.26 |
| 120 mil thick samples aged at 90 C. in water bath | | | | | | | |
| Average Hot Creep Elongation after 1 hr | Broke | Broke | Broke | Melted | Melted | 63.52 | 46.59 |

Table 5 clearly shows the synergy between $TiO_2$ and tin catalyst when present together: (1) $TiO_{2+}$ tin cure rate is faster than tin or $TiO_2$ cure when present individually. This establishes the synergy between $TiO_2$-tin catalyst and its impact on cure rate. (2) Samples with $TiO_2$ and no catalyst did not stretch or hold on under load. They melted quickly in the oven indicating that they were not crosslinked. (3) In some cases rates were even faster than the rates with a sulfonic acid catalyst. See CE 9 vs. IE 8.

TABLE 6

Hot Creep Performance of Ethylene Silane Copolymers in Crosslinked Constructions Made from Comparative Example 12 and Inventive Examples 10-11

| Sample # | CE 12 | IE 10 | IE 11 |
|---|---|---|---|
| Silink Copolymer A | 94.53 | 89.55 | 94.53 |
| DOW DNDA-8320 NT 7 Linear Low Density Polyethylene Resin | | 2.33 | 3.37 |
| DFH -2076 LLDPE | 4.29 | 4.29 | |
| DXM-446 | 0.33 | 0.33 | |
| Chemours R105 - TiO2 | | 2.50 | 1.25 |
| Carbon C | | 0.07 | 0.07 |
| 4,4-Thiobis(6-tert-butyl-m-cresol) | | 0.0003 | 0.0003 |
| 1,2-Bis(3,5-di-tert-butyl-4-hydroxyhydrocinnamoyl)hydrazine, Technical Grade | 0.08 | 0.08 | 0.08 |
| Tetrakis(methylene(3,5-di-tert-butyl-4-hydroxyhydrocinnamate))methane | 0.17 | 0.27 | 0.10 |
| Dibutyltin Dilaurate | 0.13 | 0.13 | 0.13 |
| Octyltriethoxysilane | 0.48 | 0.45 | 0.48 |
| Total | 100.00 | 100.00 | 100.00 |
| TiO2 | 0.00 | 2.50 | 1.25 |
| Dibutyltin Dilaurate | 0.13 | 0.13 | 0.13 |
| 30 mil thick sample, 23 C., 50% RH | | | |
| 1 day | Broken (tested 3 times, all broke) | 41 | 41 |
| 2 days | 37 | 33 | 41 |
| 6 days | 37 | 33 | 34 |
| 7 day | 30 | 34 | 31 |

Hot creep data for 30 mil thick sample clearly shows the synergy of TiO$_2$ with tin. Cure rates are much faster when TiO$_2$ is present with tin as compared with rates when tin is used alone.

Table 7: Hot Creep Performance of Ethylene Silane Copolymers in Crosslinked Constructions Made (i) from Comparative Examples 13-14 and Inventive Example 12, and (ii) Comparative Examples 15-16 and Inventive Example 13, indicating synergistic cure performance.

TABLE 7

| Sample # | CE 13 | CE 14 | IE 12 | CE15 | CE16 | IE13 |
|---|---|---|---|---|---|---|
| Silink Copolymer A | 95.00 | 95.00 | 95.00 | 92.50 | 92.50 | 92.50 |
| DFH -2076 LLDPE | 2.43 | 2.43 | 2.43 | 3.65 | 3.65 | 3.645 |
| AMPLIFY ™ EA 100 Functional Polymer | 2.43 | 2.43 | 2.43 | 3.65 | 3.65 | 3.645 |
| Dibutyltin Dilaurate | 0.14 | 0 | 0.07 | 0.21 | 0.00 | 0.105 |
| Tetraisopropyl Titanate | 0.00 | 0.14 | 0.07 | 0.00 | 0.21 | 0.105 |
| Total | 100.00 | 100.00 | 100.00 | 100.00 | 100.00 | 100.00 |
| Average hot creep values, % | | | | | | |
| 30 mil thick sample; Tested at 200 C./20 N; aged at 23 C., 50% RH | | | | | | |
| 1 day | break | break | break | break | break | break |
| 2 days | break | break | 104 | break | break | 88 |
| 3 days | break | break | 71 | break | break | 90 |
| 6 days | 237 | break | 56 | 178 | break | 51 |

Hot creep data for 30 mil thick sample in Table 7 clearly shows the synergy of tetratisopropyl titanate with tin. Cure rates are much faster when tetratisopropyl titanate is present with tin as compared with rates when tin is used alone.

Test Method—Antioxidant Stability

The compositions reported in Table 8 (below) are prepared in a 25 mL (5 dram) clear borosilicate glass vial with a stir bar. Butylated hydroxytoluene (BHT) is loaded into the vial to reach the targeted concentration, followed by addition of 10 mL of dodecane. The vial is then closed using a septum and the oxygen in the vial is displaced using nitrogen. The vial remains under a nitrogen blanket for the remainder of the procedure. The vial containing BHT in dodecane is placed in a heating element over a hot plate. The hot plate temperature is set at 110° C. and stirring speed is set at 500 rpm. When the target temperature of 110° C. is reached, the target amount of DB SA, dibutyltin dilaurate, TiO$_2$ and/or tetraisopropyl titanate are added to the reaction mixture. Aliquots of around 100 mg were taken out of the reaction mixture over two hours and diluted with acetonitrile to reach a dilution factor of around 100. All exact weights were recorded to +/−0.0001 g for quantification using Ultra-High Performance Liquid Chromatography (UHPLC).

Table 8—Antioxidant (BHT) Degradation Rate Constant in Model Systems made from Model Examples (ME) 1-4, Based on Comparative samples (CS) and Inventive Examples (IE).

TABLE 8

| Sample # | ME 1 (CS) | ME 2 (CS) | ME 3 (IE) | ME 4 (IE) |
|---|---|---|---|---|
| Dodecane | 93.83 | 93.62 | 93.54 | 93.22 |
| BHT | 3.66 | 3.65 | 3.63 | 3.63 |
| DBSA | 2.51 | | | |
| Dibutyltin Dilaurate (DBTDL) | | 2.73 | 1.43 | 1.47 |
| TiO2 | | | 1.40 | |
| Tetraisopropyl Titanate (Titanate) | | | | 1.68 |
| Total | 100.00 | 100.00 | 100.00 | 100.00 |
| BHT Degradation Rate Constant (s$^{-1}$), 110° C. over 2 hr | 0.52 | No degradation | No degradation | No degradation |

Table 8 and FIG. 1 demonstrate another advantage of systems based on tin-based catalyst with titanium (IV) oxide. The data shows loss of BHT antioxidant in the presence of a sulfonic acid based catalyst, whereas tin-based catalysts do not lead to degradation of the BHT antioxidant under the same conditions. This enables tin-based catalyst systems to be used with a wider range of antioxidants compared sulfonic acid based catalysts. In the case of dibutyltin dilaurate in combination with titanium (IV) oxide (TiO$_2$ or tetraisopropyl titanate), it is possible to achieve faster cure rates while avoiding antioxidant degradation, a combination of attributes that is not possible with sulfonic acid along or dibutyltin dilaurate alone.

What is claimed is:

1. A catalyst composition for promoting the cure of a silane-functionalized ethylenic polymer, the catalyst composition comprising
   (1) a tin-based catalyst, and
   (2) a titanium (IV) oxide selected from the group consisting of
      (i) titanium dioxide (TiO$_2$); and
      (ii) tetraisopropyl titanate;
   with the proviso that when the titanium (IV) oxide is tetraisopropyl titanate, catalyst composition has a tin-based catalyst to tetraisopropyl titanate weight percent ratio from 0.5:1 to 1.0:0.5, based on the total weight of the catalyst composition.

2. The catalyst composition of claim 1 in which the tin-based catalyst is at least one of dibutyl tin dilaurate (DBTDL), dimethyl hydroxy tin oleate, dioctyl tin maleate, di-n-butyl tin maleate, dibutyl tin diacetate, dibutyl tin dioctoate, stannous acetate and stannous octoate.

3. The catalyst composition of claim 2 wherein the titanium (IV) oxide is titanium dioxide (TiO$_2$).

4. The catalyst composition of claim 2 wherein the titanium (IV) oxide is tetraisopropyl titanate.

5. A masterbatch comprising (A) the catalyst composition of claim 1, and (B) a carrier resin.

6. A process for curing a silane-functionalized ethylenic polymer, the process comprising the steps of (1) forming a polymer composition by mixing the silane-functionalized ethylenic polymer and the catalyst composition of claim 1, and (2) subjecting the polymer composition to curing conditions.

7. The process of claim 6 in which the catalyst composition is in the form of a masterbatch.

8. The process of claim 6 in which the silane functionality of the silane functionalized ethylenic polymer is a derivative of a vinyl trialkoxy silane.

9. The process of claim 6 in which the curing conditions are an elevated temperature and elevated humidity.

* * * * *